United States Patent Office 3,432,409
Patented Mar. 11, 1969

3,432,409
ELECTROLYTIC PROCESS FOR MAKING TETRA-ALKYLAMMONIUM POLYBROMIDES
Mathias John Schuler, Pitman, N.J., and Kenneth Cleon Smeltz, Wilmington, Del., assignors to E. I. du Pont de Nemours and Company, Wilmington, Del., a corporation of Delaware
No Drawing. Continuation-in-part of application Ser. No. 377,312, June 23, 1964. This application June 10, 1965, Ser. No. 463,001
U.S. Cl. 204—72          12 Claims
Int. Cl. C07c 87/30; B01k 3/00

This is a continuation-in-part of the copending application of Kenneth C. Smeltz, Ser. No. 377,312, filed June 23, 1964 and now Patent No. 3,392,093.

This invention relates to a novel process for making tetraalkylammonium polybromides, particularly water-insoluble tetraalkylammonium polybromides in which each alkyl group contains 1–2 carbon atoms and which contains at least 4 bromine atoms per tetraalkylammonium group.

It is known that tetraalkylammonium bromides react with bromine to form complex bromides. [German Patent 294,408; U.S. Patent 2,679,533; Bowen and Barnes, Chem. and Ind., 254 (1945); McCombie and Reade, J.C.S., 141 (1923); Chattaway and Hoyle, J.C.S., 654 (1923); Block et al., J. Phys. and Coll. Chem., 53, 1117 (1949)]. For example, (1)
$$R_4NBr + Br_2 \rightarrow R_4NBr_3$$

where R=methyl, ethyl or a higher alkyl group.

With higher proportions of bromine, higher bromides result, (2)
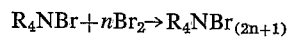
$$R_4NBr + nBr_2 \rightarrow R_4NBr_{(2n+1)}$$

where $n$ is an integer greater than 1, say 2 to 5.

Similarly a lower bromide may be transformed into a higher bromide, (3)
$$R_4NBr_3 + Br_2 \rightarrow R_4NBr_5$$

Thus, the art teaches that the transition from a lower bromide to a higher (i.e. poly) bromide requires bromine.

In general, tetraalkylammonium bromides are normally solids. While the monobromides in general are water soluble, the polybromides having 3 or more bromine atoms per molecule, tend to be water-insoluble.

The tetraalkylammonium polybromides are useful and highly active brominating and oxidizing agents. For example, they may be used for the addition of bromine to olefinic double bonds, for brominating phenols, and by virtue of their oxidizing action, as disinfectants, e.g. in swimming pools. Also, they are useful for storing and transporting bromine, as the bromine, in excess of that required to form the monobromide, is readily released by heating them at suitable elevated temperatures and/or reduced pressures, particularly in the presence of water or live steam.

Silversmith and Sloan, in their copending application Ser. No. 156,128, filed Nov. 20, 1961, now Patent No. 3,197,392, disclose a process for preparing organometal compounds, (e.g. alkyl lead compounds) in an electrolytic cell having a current permeable partition which divides the cell into an anolyte compartment and a catholyte compartment wherein an alkylating agent (e.g. alkyl bromide) is electrolytically reduced at a cathode of a metal (e.g. lead) which reacts with the alkyl group under the operating conditions, the alkylating agent being in solution in a normally liquid, initially non-hydroxylic catholyte which includes a current-carrying compound such as a tetraalkylammonium halide (e.g. tetraethylammonium bromide), and recovering the organometal compound from the catholyte solution. Such cell is operated at temperatures of from about 0° C. to about 100° C. They disclose that the anolyte may be nonhydroxylic or hydroxylic, and specifically disclose as anolytes aqueous solutions of sodium carbonate and an acetonitrile solution of tetraethylammonium bromide. Although not disclosed by Silversmith and Sloan, when the alkylating agent is a bromide, bromide ion is formed in the cathode compartment and passes into the anolyte compartment where it is oxidized to molecular bromine which is or has been difficult and/or costly to recover from the anoltye. When the anoltye is an acetonitrile solution of a tetraalkylammonium bromide, such bromine will react with the tetraalkylammonium monobromide to form a tetraalkylammonium tribromide which is soluble in the acetonitrile and is costly to recover therefrom.

K. C. Smeltz, in his copending application Ser. No. 377,312, discloses an electrolytic process for making tetraalkyl lead compounds which is an improvement over that of Silversmith and Sloan. In said application, Smeltz discloses that he employs a liquid catholyte which initially also contains small limited amounts of water and/or an alkanol of 1–4 carbon atoms, and that he operates the process at temperatures of from about 10° C. to about 80° C. preferably from about 40° C. to about 50° C. Smeltz further discloses that he may employ various anolytes, including acetonitrile solutions and aqueous solutions of 2% to about 50% by weight of tetramethylammonium monobromide and/or tetraethylammonium monobromide; that bromide ion is oxidized to bromine at the anode; that such bromine reacts with the tetraalkylammonium monobromide in the anolyte to form tetraalkylammonium tribromides normally and, in some cases, the higher polybromides which are insoluble in water and may be readily recovered therefrom and treated by known methods to release the excess bromine and regenerate the tetraalkylammonium monobromides; and that, if the anolyte is maintained at about 45° C., said tetraalkylammonium separate from the aqueous anolyte solutions as water-immiscible, heavy liquid phases which can be most readily removed from the anode compartment.

Tetraethylammonium tribromide and tetramethylammonium tribromide normally are water insoluble and melt at 85° C. and 119° C., respectively, and, when they are formed in an aqueous anolyte, they tend to form solid deposits on the anode which deposits interfere with the performance of the electrolytic cell. The same is true of tetraethylammonium tetrabromide (normally melting at 63–64° C.) when formed in an aqueous anolyte at a temperature below about 40° C.

It is an object of this invention to convert tetraalkylammonium tribromide to higher polybromides without the addition of molecular bromine. Another object is to effect anodic oxidation of tetraalkylammonium bromides in which the alkyl groups contain 1–2 carbon atoms so as to avoid the formation of solid polybromide deposits on the anode. A further object is to treat solutions of bromine and bromide ion so as to more readily recover bromine therefrom in a valuable form. Particular objects are to improve on the process of Silversmith and Sloan (hereinbefore described) and to treat the acetonitrile-tetraalkylammonium bromide solutions, obtained in the process of Smeltz (hereinbefore described) and said Silversmith and Sloan, so as to more readily recover the bromine and the tetraalkylammonium bromides therefrom. Other objects are to advance the art. Still other objects will appear hereinafter.

The above and other objects may be obtained by the process and procedures hereinafter described in some detail, including particularly the process which comprises (A) heating at least one tetraalkylammonium tribromide wherein each alkyl group contains 1–2 carbon atoms
(B) in the presence of from about 50% to about 99% by weight of water
(C) to a temperature of from about 40° C. to about 80° C. until there is formed a distinct layer of water-insoluble, liquid tetraalkylammonium polybromide, which contains at least 4 bromine atoms per tetraalkylammonium group, and an aqueous layer, and
(D) separating said layer of tetraalkylammonium polybromide from the aqueous layer.

It has been found that by such process a substantial proportion of the tetraalkylammonium tribromide is converted to a higher bromine content polybromide having a lower melting point than the original tribromide, apparently through a disproportionation reaction which takes place in the presence of water at temperatures of from about 40° C. to about 80° C. wherein bromine is transferred from some of the tribromide molecules to other tribromide molecules forming the higher (tetra- or penta-) bromides and the lower (mono-) bromide. This disproportionation was unexpected and, indeed, it should be expected that the reverse reaction would be favored. The probable transformation can be represented by the equation (4) 
$$2R_4NBr_3 \rightarrow R_4NBr + R_4NBr_5$$

wherein R represents methyl or ethyl groups.

When R is ethyl, i.e. tetraethylammonium bromides, the structure of the higher polybromide product is not known exactly but appears to be a complex of the tribromide and the pentabromide showing an average tetrabromide composition as represented by the equation.

(5) 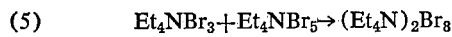
$$Et_4NBr_3 + Et_4NBr_5 \rightarrow (Et_4N)_2Br_8$$

wherein "Et" stands for the "ethyl" groups. Such tetrabromide composition is insoluble in water and, in the absence of water, melts at 63° C. to 64° C. Unexpectedly however, it appears in molten or liquid form at temperatures as low as 40° C.–45° C. in the presence of water, whereby it forms a liquid layer below the aqueous solution of the monobromide and can be readily separated therefrom as by decantation.

On the other hand, the tetramethylammonium tribromide forms a higher polybromide having an average structure corresponding roughly to a pentabromide and which is liquid at room temperatures and does not appear to crystallize at ice (0° C.) temperatures. This higher polybromide also is insoluble in and heavier than water and forms a liquid layer below the aqueous solution of the monobromide, whereby it can be readily drawn off from the aqueous solution.

The tetraalkylammonium polybromides, obtained by the process of this invention, are richer in active bromine than the tribromides and, in general, are more active as brominating agents and oxidizing agents.

The mixtures of the tetraalkylammonium tribromides and water that are to be treated by the process of this invention may be obtained by various methods and from various sources, e.g. by merely mixing the tribromides with the desired amount of water; by anodic oxidation of bromide ion in aqueous solutions of the tetraalkylammonium monobromides; and by anodic oxidation of bromide ion in water-acetonitrile solutions of the tetraalkylammonium monobromides, or in substantially anhydrous acetonitrile solutions thereof followed by diluting the acetonitrile solutions with the desired amount of water, and removing the acetonitrile by distillation under reduced pressure.

The anodic oxidation in water solution may be accomplished by (A) passing an electrolyzing direct electric current through (B) an anolyte which consists essentially of a solution of
  (1) from about 1% to about 50% by weight of at least one tetraalkylammonium monobromide wherein each alkyl group contains 1–2 carbon atoms
  (2) in water
(C) while maintaining said anolyte at a temperature of from about 40° C. to about 80° C. until there is formed below the aqueous solution a distinct layer of water-insoluble, liquid tetraalkylammonium polybromide which contains at least 4 bromine atoms per tetraalkylammonium group, and
(D) separating said layer of tetraalkylammonium polybromide from the aqueous solution.

This process oxidizes the bromide ion to bromine which reacts with the tetraalkylammonium monobromide to form the desired tetralkylammonium polybromide (probably involving the formation of the tetraalkylammonium tribromide as a transitory intermediate). During electrolysis at temperatures below about 40° C., the tetraalkylammonium tribromides are produced which form objectionable solid deposits on the anode. However, if the electrolysis is conducted at about 40° C. to about 80° C., solid adherent deposits of tetraalkylammonium bromides are not formed on the anode but form drops thereon which drip off as they are formed and collect at the bottom of the anolyte as a separate readily removed liquid layer of tetraalkylammonium polybromide of high bromine content.

The anodic oxidation process can be conducted as a half-cell reaction coupled with any suitable cathodic reduction half-cell reaction in accordance with known principles and techniques, particularly in various electrolytic processes which produce bromide ion at the cathode and oxidize bromide ion at the anode, such as that of Silversmith and Sloan hereinbefore referred to, by using as the anolyte therein an aqueous solution of the tetraalkylammonium monobromide. For example, the anode reaction can be coupled with the reductive alkylation of a lead cathode by means of an alkyl halide, e.g. a $C_1$–$C_{10}$ alkyl chloride, bromide or iodide, in an electrolyte containing the tetraalkylammonium monobromide, employing a current and ion permeable membrane, such as parchment or a cation exchange resin membrane, as a partition between the cathode and anode compartments so as to prevent contact of the tetraalkyl lead product of the cathode reaction with the polybromide product of the anode reaction, and thus prevent reaction between these products. This has material practical and economic advantages in such electrolytic processes as it immediately regenerates a material proportion of the original anolyte, and provides a simple and economical method for recovering the bromine formed in the electrolysis in valuable form, all or any desired part of which can be used to form additional amounts of the anolyte. Such a process will comprise (A) passing an electrolyzing direct electric current through an electrolytic cell having a cathode compartment containing a lead cathode and an anolyte compartment containing an inert anode, said compartments being separated by a current-permeable membrane,
  (1) said cathode compartment initially containing a liquid catholyte comprising an alkyl bromide alkylating agent and a tetraalkylammonium monobromide as a current-carrier, and
  (2) said anolyte compartment initially containing a liquid anolyte which consists essentially of a solution of from about 1% to about 50% by weight of a tetraalkylammonium monobromide in which each alkyl group contains 1–2 carbon atoms, in water,
(B) maintaining said anolyte at a temperature of from about 40° C. to about 80° C. during the electroylsis and until there is formed below said anolyte a layer of water-immiscible, liquid tetraalkylammonium polybromide which contains at least 4 bromine atoms per tetraalkylammonium group, and (C) separating said layer of tetraalkylammonium polybromide from said anolyte.

Also, as disclosed by Smeltz in his application hereinbefore referred to, such anodic oxidation process can be used as a part of his process for making tetraalkyl lead compounds, with like advantages.

In some electrolytic processes, such as those of Silversmith and Sloan and of Smeltz, it has been found to be desirable to employ anolytes which consist essentially of solutions of the tetraalkylammonoum monobromides in aqueous acetonitrile in which the tetraalkylammonium polybromides are soluble. Such anolytes will consist essentially of from about 5% to about 35% by weight, usually and preferably about 20%, of the tetraalkylammonium monobromide; from about 5% to about 70% by weight, preferably about 15%, of water; and from about 75% to about 25% by weight, preferably about 65%, of acetonitrile. During the electrolysis, there will be produced a homogeneous anolyte which, when using the broader range of proportions, will consist essentially of from about 1% to about 10% by weight of the tetraalkylammonium monobromide from about 5% to about 20% by weight of the tetraalkylammonium polybromide (taken as the tribromide), from about 5% to about 70% by weight of water and from about 75% to about 25% by weight of the acetonitrile; and when using the usual and preferred proportions, consists essentially of about 4% by weight of tetraalkylammonium monobromide, about 17% by weight of tetraalkylammonium polybromide (taken as the tribromide), about 14% by weight of water, and about 65% by weight of acetonitrile.

The acetonitrile can be stripped out of the resulting anolyte at relatively low still pot temperatures of from about 40° C. to about 80° C., preferably from about 55° C. to about 65° C. at reduced pressures of from about 150 mm. of Hg to about 300 mm. of Hg, respectively, to yield aqueous tetraalkylammonium polybromide products, the acetonitrile coming off overhead as vapor having a head temperature of from about 34° C. to about 51° C. If such still pot temperatures are used, there will be formed directly a lower layer of liquid tetraalkylammonium polybromide containing at least 4 atoms of bromine per tetraalkylammonium group and an upper aqueous layer, which layers can be readily separated. The lower liquid layer of tetraalkylammonium polybromide begins to form when the acetonitrile concentration is decreased to below 25% by weight, i.e. between about 20% and about 25%, and increases in amount as the concentration of the acetonitrile is decreased. Splitting of the polybromide to free bromine during this nitrile-stripping step is minimized by the combination of low temperatures, relatively low water content, and the presence of tetraalkylammonium monobromide.

If the stripping of the acetonitrile is conducted at a pot temperature below about 40° C., the residual aqueous mixture must be heated to a temperature of from about 40° C. to about 80° C. in order to obtain the desired liquid tetraalkylammonium polybromide. Such a process may be described as comprising (A) passing an electrolyzing direct electric current through a cell containing
(B) an anolyte which consists essentially of
   (1) from about 5% to about 35% by weight of a tetraalkylammonium monobromide in which each alkyl group contains 1-2 carbon atoms,
   (2) from about 5% to about 70% by weight of water, and
   (3) from about 75% to about 25% by weight of acetonitrile,
(C) maintaining the anolyte at a temperature of from about 40° C. to about 80° C. during the electrolysis,
(D) recovering anolyte from the cell,
(E) removing the acetonitrile from the recovered anolyte by distillation at a still pot temperature of from about 40° C. to about 80° C. and pressures from about 150 to about 300 mm. Hg, whereby there is formed a distinctive lower layer of water-insoluble, liquid tetraalkylammonium polybromide which contains at least 4 bromine atoms per tetraalkylammonium group, and
(F) separating said lower layer of tetraalkylammonium polybromide from the upper aqueous layer.

In a similar manner, the anolyte products, obtained by the use of substantially anhydrous acetonitrile solutions of the tetraalkylammonium monobromides as the initial anolytes in the processes of Silversmith and Sloan and of Smeltz hereinbefore referred to, can be treated to more easily and economically recover the bromine content thereof. Such treatment comprises diluting the acetonitrile solution of the tetraalkylammonium polybromides with from about 5% to about 70% by weight of water, stripping the acetonitrile from the diluted solutions as described above with respect to aqueous acetonitrile solutions, and separating the layer of liquid tetraalkylammonium polybromide from the aqueous layer. The separated tetraalkylammonium polybromides can then be treated to drive off molecular bromine and regenerate tetraalkylammonium monobromide for reuse.

The tetraalkylammonium bromides that are used in the process of this invention may be represented by the formula $R_4NBr_n$ wherein R represents an alkyl group of 1-2 carbon atoms, e.g. methyl and ethyl groups, and $n$ is 1 or 3. Thus, $R_4$ may be tetramethyl, tetraethyl, trimethylethyl, dimethyldiethyl, or methyltriethyl. Mixtures of any two or more of said tetraalkylammonium bromides may be used.

In the mixtures of water and tetraalkylammonium tribromides, the water should be at least about 50% by weight of the mixture and conveniently should not be more than about 99% by weight thereof, the tetraalkylammonium tribromide conveniently being from about 50% to about 1% by weight of the mixture. Preferably, the water should be in the range of about 65% to about 95% by weight and the tetraalkylammonium tribromide in the range of about 35% to about 5% by weight of the mixture. Similarly in the solutions of the tetraalkylammonium monobromides in water, acetonitrile or mixtures of water and acetonitrile, the tetraalkylammonium monobromide conveniently will constitute from about 1% to about 50% by weight of the solution, preferably from about 5% to about 35% by weight.

In the simplest forms of the invention, tetraalkylammonium tribromide, as such or formed in situ by oxidation of bromide ion in the presence of the appropriate tetraalkylammonium monobromide, is simply heated in the presence of water to a temperature in the range of from about 40° C. to about 80° C., preferably from about 40° C. to about 50° C., at which tribromide undergoes transformation into a higher-bromide content, lower-melting product. The molten lower phase can be separated from the residual water layer at the operating temperatures or at lower temperatures. In the tetraethylammonium system, the higher polybromide solidifies on cooling to room temperatures and below. On the other hand, the tetramethylammonium polybromide product remains liquid at ordinary temperatures as well, a convenience in handling.

Remarkably, in the electrolytic method, the liquid higher polybromide begins to form substantially immediately even in the presence of the rather large proportions of monobromide.

Preferably, in the continuous anodic oxidation of aqueous tetramethyl and tetraethylammonium monobromides the high bromine content polybromide product is removed as formed as a separate liquid layer phase, by decantation for example.

During the transformation of tribromide to higher polybromide by this method, the pressure on the system is normally atmospheric. Pressures higher than atmospheric can be used, but lower pressures promote splitting off $Br_2$ from the polybromide. In general also, increasing the temperature tends to increase the splitting off of $Br_2$.

To recover molecular bromine, the polybromides are simply heated in water or with live steam at temperatures and pressures required to result in rapid dissociation of bromine from the complex (6) $\quad R_4NBr_{2n+1} \rightarrow R_4NBr + nBr_2$ as disclosed for example in U.S. Patent 2,784,063 and German Patent 694,408. At atmospheric pressure, temperatures of about 100° C. are suitable; lower temperatures may be used with lower pressures, say 55° C. at 130 mm. of Hg pressure. The bromine vaporizes away, leaving aqueous tetraalkylammonium monobromide behind.

Preferably, the distillation for bromine recovery is effected with at least about 0.5 to 1 part and with up to about 200 parts by weight of water per part of tetraalkylammonium polybromide. Water distills with the bromine; makeup water can be added to the still during the operation (e.g. as steam) or the distillate water (after separation from the distillate $Br_2$) can be returned to the still.

In order to more clearly illustrate this invention, representative modes of carrying it into effect, and results to be obtained thereby, the following examples are given in which the parts and proportions are by weight unless otherwise stated.

Example 1

400 parts of tetraethylammonium tribromide ($Et_4NBr_3$), (average active bromine content of 40.7%, M.P. 84–86° C.) were mixed with 1200 parts of water and the mixture heated to 75° C. with stirring until all the $Et_4NBr_3$ melted. The orange colored solid melted to a heavy red liquid. The mixture was cooled slowly with rapid stirring to 30° C., then with a water-ice bath to cause the formation of large, deep-red crystals.

Recovered by filtration and dried in air, the crystalline product is orange-red, melts at 63–64° C., has an active bromine content of 53.0% as determined by titration for active halogen with standard thiosulfate, and analyzes as follows.

Calc'd for $C_{16}H_{40}Br_8N_2$: C, 21.75; H, 4.55; N, 3.12; Br, 69.65. Found: C, 21.37; H, 4.48; N, 3.11; Br, 71.10; active bromine, 53.30%.

In terms of the original formulation for the tribromide, this product corresponds closely to the tetrabromide, $Et_4NBr_4$. It is soluble in acetonitrile and tetrahydrofuran and may be recrystallized from hot o-dichlorobenzene.

In contrast, on heating tetra(n-propyl)ammonium tribromide or tetra(n-butyl)ammonium tribromide under the same conditions, tribromide, not higher polybromide, is recovered from the reaction mass as the insoluble product.

Example 2

5.6 parts of tetramethylammonium tribromide (active bromine content of 50.80%, M.P. 119° C.) were mixed with 20 parts of water. The mixture was heated rapidly to 45° C. Almost immediately on mixing and beginning the heating, the reaction mass formed a lower, deep-red liquid. It was then cooled to room temperature. The deep-red, lower liquid layer, which does not freeze on cooling with a water-ice bath, was separated from the mixture. It had an active bromine content of 65.7%, which corresponds to the pentabromide, $Me_4NBr_5$.

Example 3

An electrolytic cell was used which comprised a lead cathode, a platinum anode, and separate catholyte and anolyte compartments separated by a parchment paper membrane. The cell was equipped with means for recirculating the catholyte and anolyte solutions. The initial catholyte consisted of 50 parts of tetraethylammonium monobromide ($Et_4NBr$), 516 parts of acetonitrile and 100 parts of methyle bromide. The initial anolyte consisted of 1810 parts of a 5% aqueous solution of tetraethylammonium monobromide ($Et_4NBr$). The solutions were added to their respective compartments and reservoirs. The pumps were started and the solutions were recirculated through their respective compartments. They were also heated to the desired temperature during the recirculation as indicated below. The direct current was turned on and the electrolysis was run for 2 hours and 15 minutes. During the first five minutes, the amperage was raised from 0.5 to 2.0 amperes and then held constant at 2.0 amperes for the remainder of the run. The voltage was increased from 2.8 to 5.7 volts in the first five minutes but varied between 5.2 and 6.2 volts during the rest of the electrolysis. The catholyte temperature was raised from 28.5° C. to 42° C. during the first 15 minutes and held at 40±2° C. for the duration of the run. The anolyte temperature was maintained at 45° C.

Within a few seconds after the direct current was turned on, a red liquid formed as insoluble droplets on the platinum anode. This ran off and collected as a lower layer in the anolyte and was drained off periodically during the course of the electrolysis.

This red liquid tetraethylammonium bromide-bromine complex remained liquid below the water anolyte mixture at temperatures greater than about 40° C. On cooling to room temperature (25±2° C.), the complex solidified, and the upper aqueous layer was decanted from the deep-red, crystalline solid. This was essentially the same product as is described in Example 1; it melted at 61–63° C. in the absence of water and had an active bromine content of 52.9%. A total of 11.44 parts was obtained, which corresponded to about an 88% yield of molecular $Br_2$ based on the current passed.

The catholyte contained tetramethyl lead in 84% yield based on the current passed and 92% based on the weight of the lead cathode consumed.

Example 4

An electrolysis was run similar to that in Example 3 except that a static cell was used (no recirculation of solutions) and a 4% aqueous solution of tetramethylammonium monobromide was used as the anolyte.

After four hours of electrolysis, the anolyte composition consisted essentially of a deep-red liquid layer of a tetramethylammonium polybromide complex surmounted by residual aqueous tetramethylammonium monobromide. The polybromide product was similar to that described in Example 2 and had an active bromine content of 68.7%.

Example 5

3.25 parts of the polybromide, obtained in Example 3 was heated with 75 parts $H_2O$ at 55–60° C. and 130 mm. Hg pressure. Bromine distilled with water vapor. Distillation was continued until the residual solution in the still was colorless. Analysis of the distillate indicated that 99.9% of the active bromine content of the complex had been recovered.

Substantially the same high bromine recovery was achieved by heating the polybromide with live steam in a distillation apparatus at normal atmospheric pressures. Molecular $Br_2$ distilled with water vapor, leaving behind aqueous tetraethylammonium monobromide.

It will be understood that the foregoing examples are given for illustrative purposes solely, and that this invention is not limited to the specific embodiments described therein. On the other hand, it will be apparent to those skilled in the art that, subject to the limitations set forth in the general description, many variations can be made in the materials, proportions, conditions and techniques employed without departing from the spirit and scope of this invention.

From the foregoing description, it will be apparent that this invention provides a new and improved process for making water-insoluble tetraalkylammonium polybromides in a condition in which they can be readily recovered. In constitutes a material improvement over the processes of the prior art. It is particularly valuable for use in electrolytic processes which involve the formation of bromide ion and in which it is desired to use tetraalkylammonium monobromides as current-carriers, as it provides a convenient and economical method of recovering the bromide ion as bromine from the electrolytes and of regenerating the tetraalkylammonium monobromides. Accordingly, it will be apparent that this invention constitutes an important and valuable advance in and contribution to the art.

The embodiments of the invention in which an exclusive property or privilege is claimed are defined as follows:

1. The process for making water-insoluble tetraalkylammonium polybromides, which comprises
   (A) heating at least one tetraalkylammonium tribromide wherein each alkyl group contains 1–2 carbon atoms
   (B) in the presence of from about 50% to about 99% by weight of water
   (C) to a temperature of from about 40° C. to about 80° C. until there is formed a distinct layer of water-insoluble, liquid tetraalkylammonium polybromide, which contains at least 4 bromine atoms per tetraalkylammonium group, and an aqueous layer, and
   (D) separating said layer of tetraalkylammonium polybromide from the aqueous layer.

2. The process for making water-insoluble tetraalkylammonium polybromides, which comprises
   (A) heating at least one tetraalkylammonium tribromide wherein each alkyl group contains 1–2 carbon atoms
   (B) in the presence of from about 65% to about 95% by weight of water
   (C) to a temperature of from about 40° C. to about 50° C. until there is formed a distinct layer of water-insoluble, liquid tetraalkylammonium polybromide, which contains at least 4 bromine atoms per tetraalkylammonium group, and an aqueous layer, and
   (D) separating said layer of tetraalkylammonium polybromide from the aqueous layer.

3. The process for making water-insoluble tetraethylammonium polybromides, which comprises
   (A) heating tetraethylammonium tribromide
   (B) in the presence of from about 65% to about 95% by weight of water
   (C) to a temperature of from about 40° C. to about 50° C. until there is formed a distinct layer of water-insoluble, liquid tetraethylammonium polybromide, which contains at least 4 bromine atoms per tetraethylammonium group, and an aqueous layer, and
   (D) separating said layer of tetraethylammonium polybromide from the aqueous layer.

4. The process for making water-insoluble tetramethylammonium polybromides, which comprises
   (A) heating tetramethylammonium tribromide
   (B) in the presence of from about 65% to about 95% by weight of water
   (C) to a temperature of from about 40° C. to about 50° C. until there is formed a distinct layer of water-insoluble liquid tetramethylammonium polybromide, which contains at least 4 bromine atoms per tetramethylammonium group, and an aqueous layer, and
   (D) separating said layer of tetramethylammonium polybromide from the aqueous layer.

5. The process for making water-insoluble tetraalkylammonium polybromides, which comprises,
   (A) passing an electrolyzing direct electric current through
   (B) an anolyte which consists essentially of a solution of
      (1) from about 1% to about 50% by weight of at least one tetraalkylammonium monobromide wherein each alkyl group contains 1–2 carbon atoms
      (2) in water
   (C) while maintaining said anolyte at a temperature of from about 40° C. to about 80° C. until there is formed below the aqueous solution a distinct layer of water-insoluble, liquid tetraalkylammonium polybromide which contains at least 4 bromine atoms per tetraalkylammonium group, and
   (D) separating said layer of tetraalkylammonium polybromide from the aqueous solution.

6. The process for making water-insoluble tetraalkylammonium polybromides, which comprises
   (A) passing an electrolyzing direct electric current through
   (B) an anolyte which consists essentially of a solution
      (1) from about 5% to about 35% by weight of at least one tetraalkylammonium monobromide wherein each alkyl group contains 1–2 carbon atoms
      (2) in water
   (C) while maintaining said anolyte at a temperature of from about 40° C. to about 50° C. until there is formed below the aqueous solution a distinct layer of water-insoluble, liquid tetraalkylammonium polybromide which contains at least 4 bromine atoms per tetraalkylammonium group, and
   (D) separating said layer of tetraalkylammonium polybromide from the aqueous solution.

7. The process for making water-insoluble tetraethylammonium polybromides, which comprises
   (A) passing an electrolyzing direct electric current through
   (B) an anolyte which consists essentially of a solution of
      (1) from about 5% to about 35% by weight of tetraethylammonium monobromide
      (2) in water
   (C) while maintaining said anolyte at a temperature of from about 40° C. to about 50° C. until there is formed below the aqueous solution, a distinct layer of water-insoluble, liquid tetraethylammonium polybromide which contains at least 4 bromine atoms per tetraethylammonium group, and
   (D) separating said layer of tetraethylammonium polybromide from the aqueous solution.

8. The process for making water-insoluble tetramethylammonium polybromides, which comprises
   (A) passing an electrolyzing direct electric current through
   (B) an anolyte which consists essentially of a solution of
      (1) from about 5% to about 35% by weight of tetramethyl ammonium monobromide
      (2) in water
   (C) while maintaining said anolyte at a temperature of from about 40° C. to about 50° C. until there is formed below the aqueous solution a distinct layer of water-insoluble, liquid tetramethylammonium polybromide which contains at least 4 bromine atoms per tetramethylammonium group, and
   (D) separating said layer of tetramethylammonium polybromide from the aqueous solution.

9. The process for making water-insoluble tetraalkylammonium polybromides, which comprises
   (A) passing an electrolyzing direct electric current through an electrolytic cell having a cathode compartment containing a lead cathode and an anolyte compartment containing an inert anode, said compartments being separated by a current-permeable membrane, (1) said cathode compartment initially containing a liquid catholyte comprising an alkyl bromide alkylating agent and a tetraalkylammonium monobromide as a current-carrier, and
(2) said anolyte compartment initially containing a liquid anolyte which consists essentially of a solution of from about 1% to about 50% by weight of a tetraalkylammonium monobromide in which each alkyl group contains 1–2 carbon atoms, in water,
(B) maintaining said anolyte at a temperature of from about 40° C. to about 80° C. during the electrolysis and until there is formed below said anolyte a layer of water-immiscible, liquid tetraalkylammonium polybromide which contains at least 4 bromine atoms per tetraalkylammonium group, and
(C) separating said layer of tetraalkylammonium polybromide from said anolyte.

10. The process for making water-insoluble tetraalkylammonium polybromides, which comprises
(A) passing an electrolyzing direct electric current through an electrolytic cell having a cathode compartment containing a lead cathode and an anolyte compartment, containing an inert anode, said compartments being separated by a current-permeable membrane,
(1) said cathode compartment initially containing a liquid catholyte comprising an alkyl bromide alkylating agent and a tetraalkylammonium monobromide as a current-carrier, and
(2) said anolyte compartment initially containing a liquid anolyte which consists essentially of a solution of from about 5% to about 35% by weight of a tetraalkylammonium monobromide in which each alkyl group contains 1–2 carbon atoms, in water,
(B) maintaining said anolyte at a temperature of from about 40° C. to about 50° C. during the electrolysis and until there is formed below said anolyte a layer of water-immiscible, liquid tetraalkylammonium polybromide which contains at least 4 bromine atoms per tetraalkylammonium group, and
(C) separating said layer of tetraalkylammonium polybromide from said anolyte.

11. The process for making water-insoluble tetraalkylammonium polybromides, which comprises
(A) passing an electrolyzing direct electric current through a cell containing
(B) an anolyte which consists essentially of
(1) from about 5% to about 35% by weight of a tetraalkylammonium monobromide in which each alkyl group contains 1–2 carbon atoms,
(2) from about 5% to about 70% by weight of water, and
(3) from about 75% to about 25% by weight of acetonitrile,
(C) maintaining the anolyte at a temperature of from about 40° C. to about 80° C. during the electrolysis,
(D) recovering anolyte from the cell,
(E) removing the acetonitrile from the recovered anolyte by distillation at a still pot temperature of from about 40° C. to about 80° C. and pressures of from about 150 to about 300 mm. of Hg, whereby there is formed a distinct lower layer of water-insoluble, liquid tetraalkylammonium polybromide which contains at least 4 bromide atoms per tetraalkylammonium group, and
(F) separating said lower layer of tetraalkylammonium polybromide from the upper aqueous layer.

12. The process for making water-insoluble tetraalkylammonium polybromides, which comprises
(A) passing an electrolyzing direct electric current through a cell containing
(B) an anolyte which consists essentially of
(1) about 20% by weight of a tetraalkylammonium monobromide in which each alkyl group contains 1–2 carbon atoms,
(2) about 15% by weight of water, and
(3) about 65% by weight of acetonitrile,
(C) maintaining the anolyte at a temperature of from about 40° C. to about 50° C. during the electrolysis,
(D) recovering anolyte from the cell,
(E) removing the acetonitrile from the anolyte by distillation at a still pot temperature of from about 55° C. to about 65° C. and pressures of from about 150 to about 300 mm. of Hg, whereby there is formed a distinct lower layer of water-insoluble, liquid tetraalkylammonium polybromide which contains at least 4 bromine atoms per tetraalkylammonium group, and
(F) separating said lower layer of tetraalkylammonium polybromide from the upper aqueous layer.

References Cited

UNITED STATES PATENTS

| | | | |
|---|---|---|---|
| 2,679,533 | 5/1954 | Darragh et al. | 260—567.6 |
| 3,197,392 | 7/1965 | Silversmith et al. | 204—59 |

FOREIGN PATENTS

| | | |
|---|---|---|
| 1,126,396 | 3/1962 | Germany. |
| 1,131,694 | 6/1962 | Germany. |

ROBERT K. MIHALEK, *Primary Examiner.*

H. M. FLOURNOY, *Assistant Examiner.*

U.S. Cl. X.R.

260—567.6